United States Patent [19]

Magnuson

[11] Patent Number: 5,692,335
[45] Date of Patent: Dec. 2, 1997

[54] COMBINED SEAT AND TACKLE CONTAINER FOR ICE FISHING

[76] Inventor: Donald Magnuson, R.R. 2, Box 251, Henning, Minn. 56551

[21] Appl. No.: 567,153

[22] Filed: Dec. 5, 1995

[51] Int. Cl.$^6$ ............................................. A01K 97/00
[52] U.S. Cl. ................ 43/54.1; 297/188.08; 297/188.1; 312/235.5
[58] Field of Search ............... 43/54.1; 297/188.08, 297/188.09, 188.1; 312/235.2, 235.5; 206/315.11

[56] References Cited

U.S. PATENT DOCUMENTS

| D. 200,309 | 2/1965 | Sokolis | 297/188.08 |
|---|---|---|---|
| 2,264,744 | 12/1941 | Dunnam | 43/54.1 |
| 2,493,084 | 1/1950 | Pharo | 43/54.1 |
| 2,681,809 | 6/1954 | Hamill | 297/188.1 |
| 2,692,007 | 10/1954 | Christian | 297/188.08 |
| 2,812,227 | 11/1957 | Hill | 312/235.2 |
| 4,883,317 | 11/1989 | Davenport | 297/188.1 |
| 4,918,853 | 4/1990 | Bascom | 43/54.1 |
| 5,100,198 | 3/1992 | Baltzell | 43/54.1 |
| 5,269,157 | 12/1993 | Ciminelli | 297/188.1 |
| 5,458,395 | 10/1995 | Skarda | 297/188.1 |

Primary Examiner—Kurt Rowan
Attorney, Agent, or Firm—Moore & Hansen

[57] ABSTRACT

A combined seat and tackle container for ice fishing including a seating portion on which an ice fisherman may rest while watching an ice fishing pole. Additionally, it includes compartments for holding a variety of fishing needs. A rear storage compartment integral with the back resting portion may be used for storage of spare fishing rods or tip-ups. A hinged seat covers an upper storage compartment in which small items such as snacks and beverages may be stored, and the underside of the hinged seat may be covered with a material such as cork or styrofoam into which the hooks of artificial fishing lures may be placed for storage. Finally, a lower storage compartment therebeneath may be used for storage of fish that have been caught. A carrying handle may be attached to the housing to make it easy to transport the assembly.

7 Claims, 4 Drawing Sheets

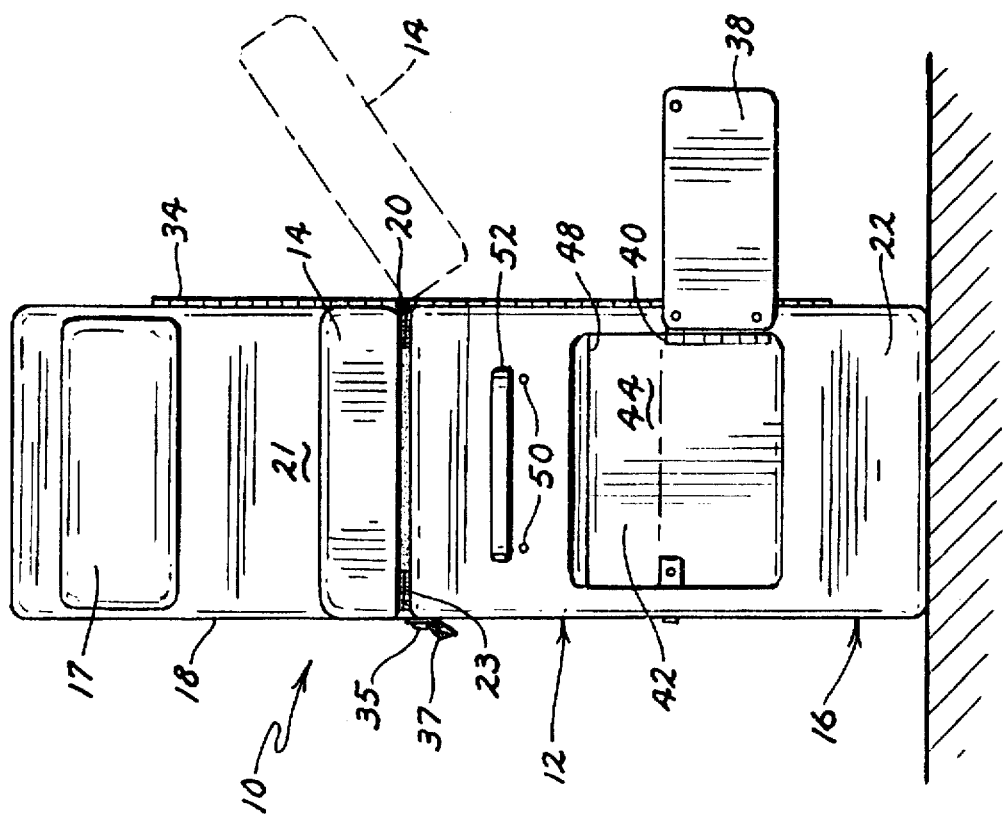
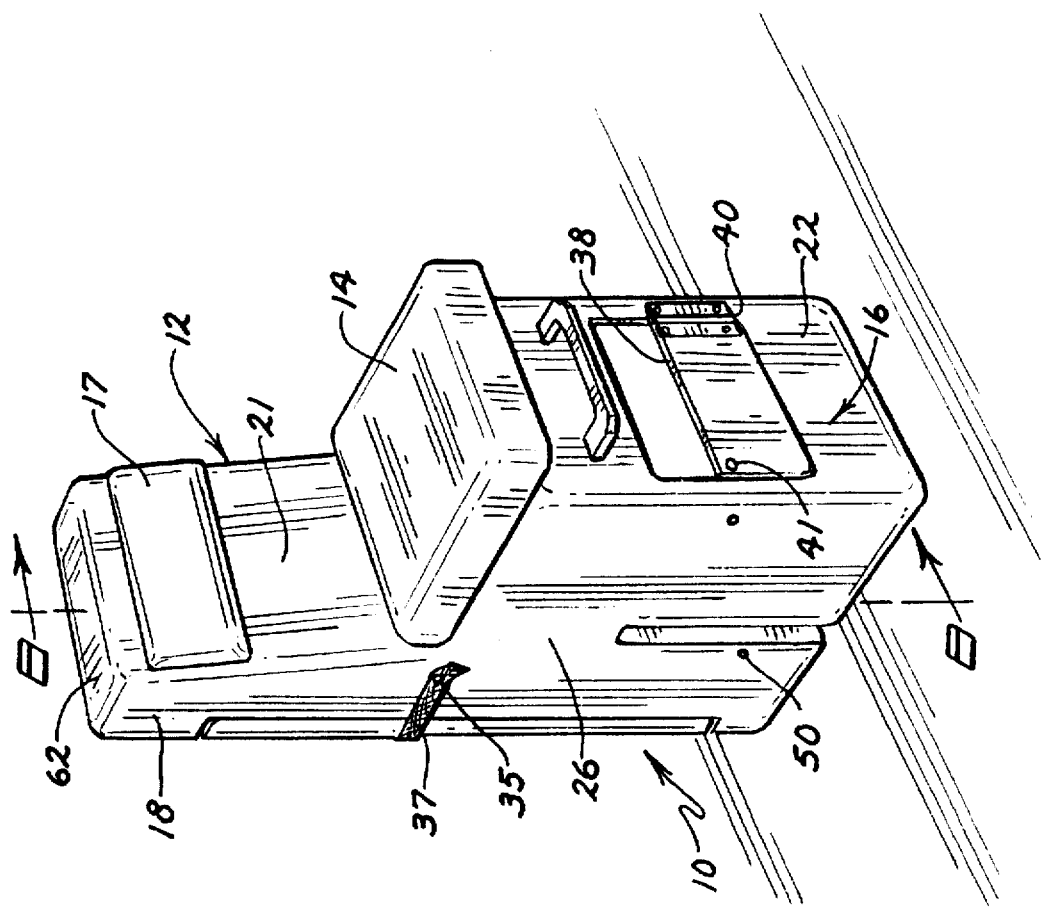

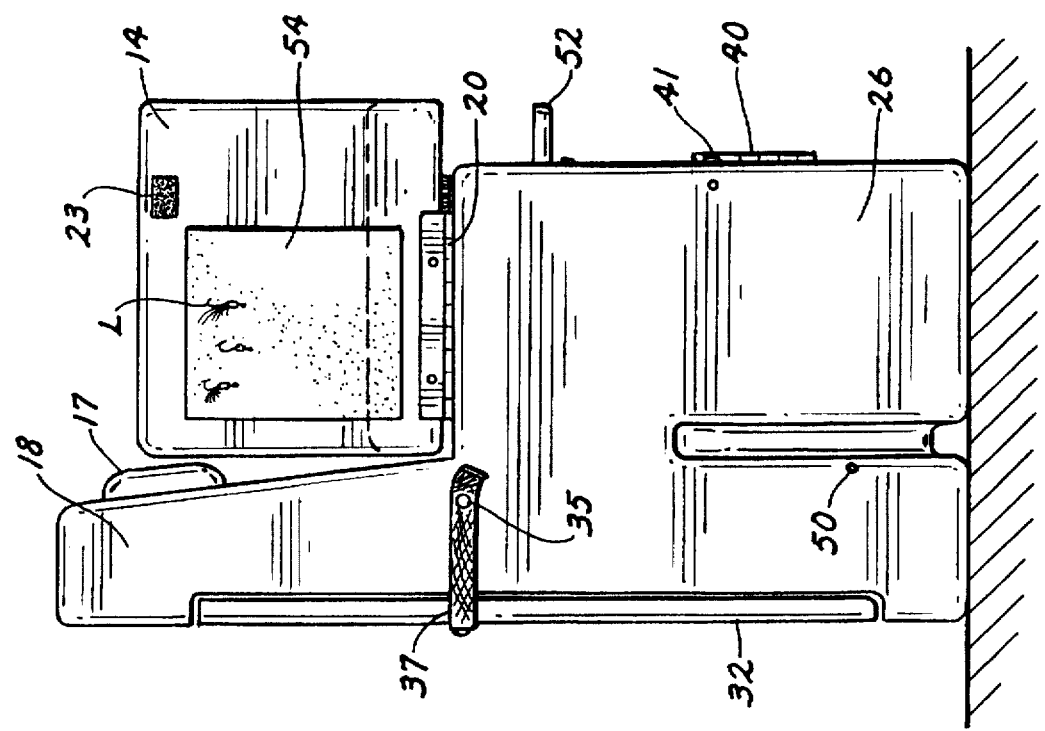
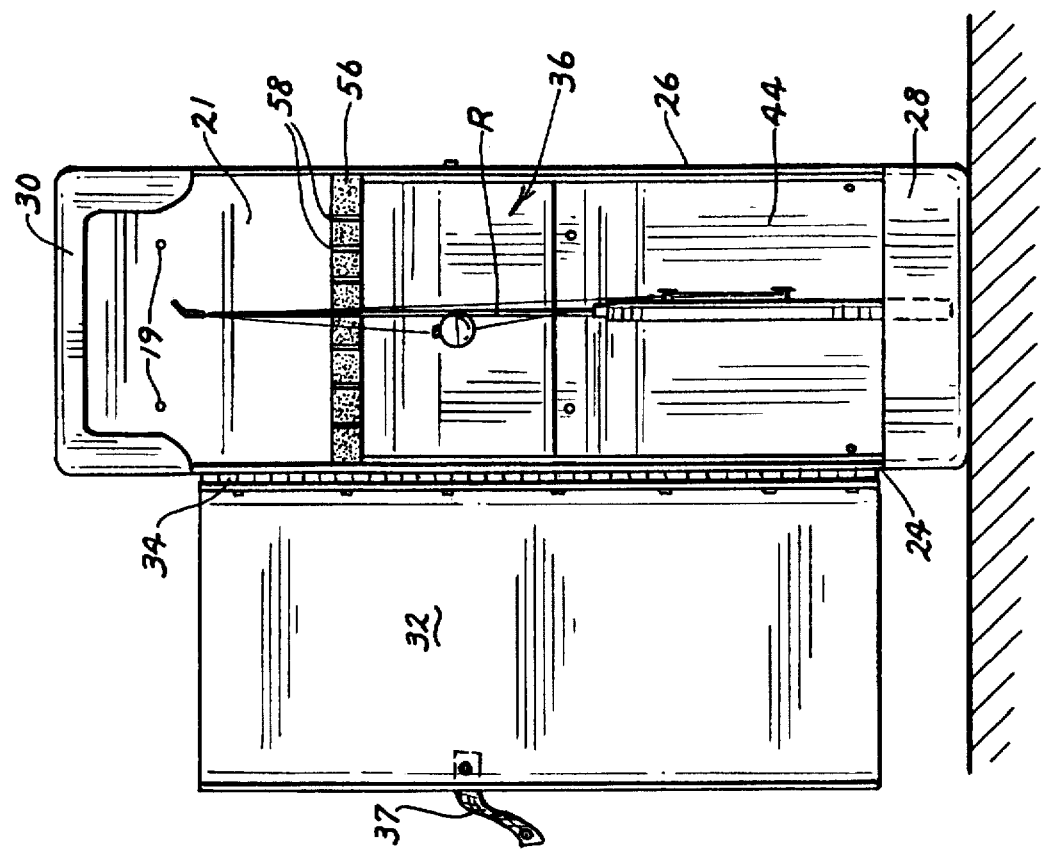

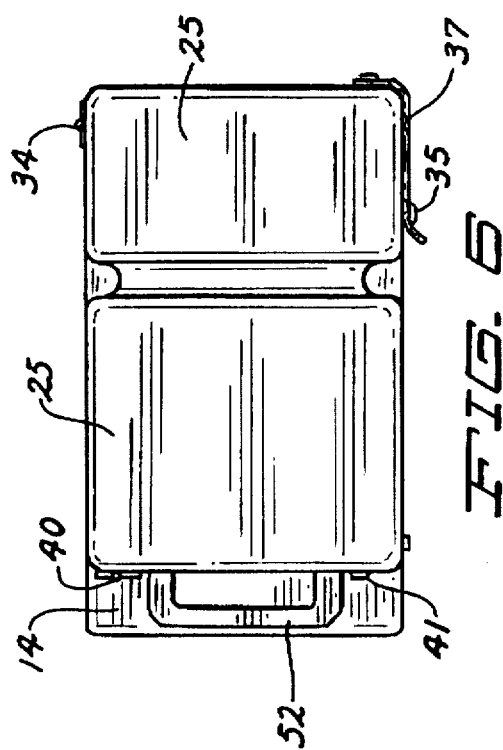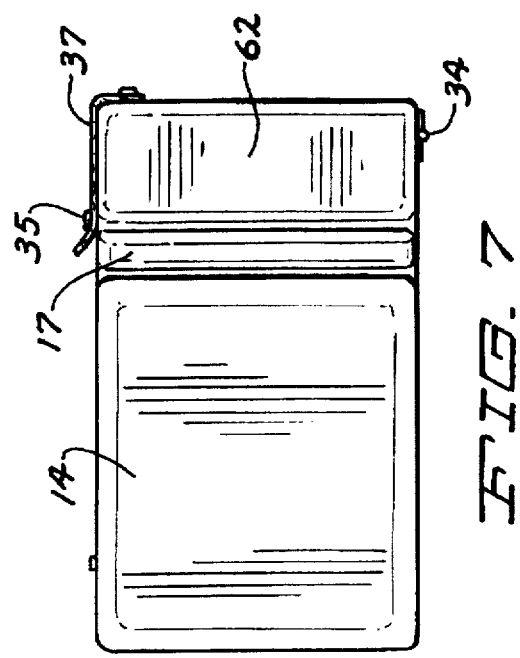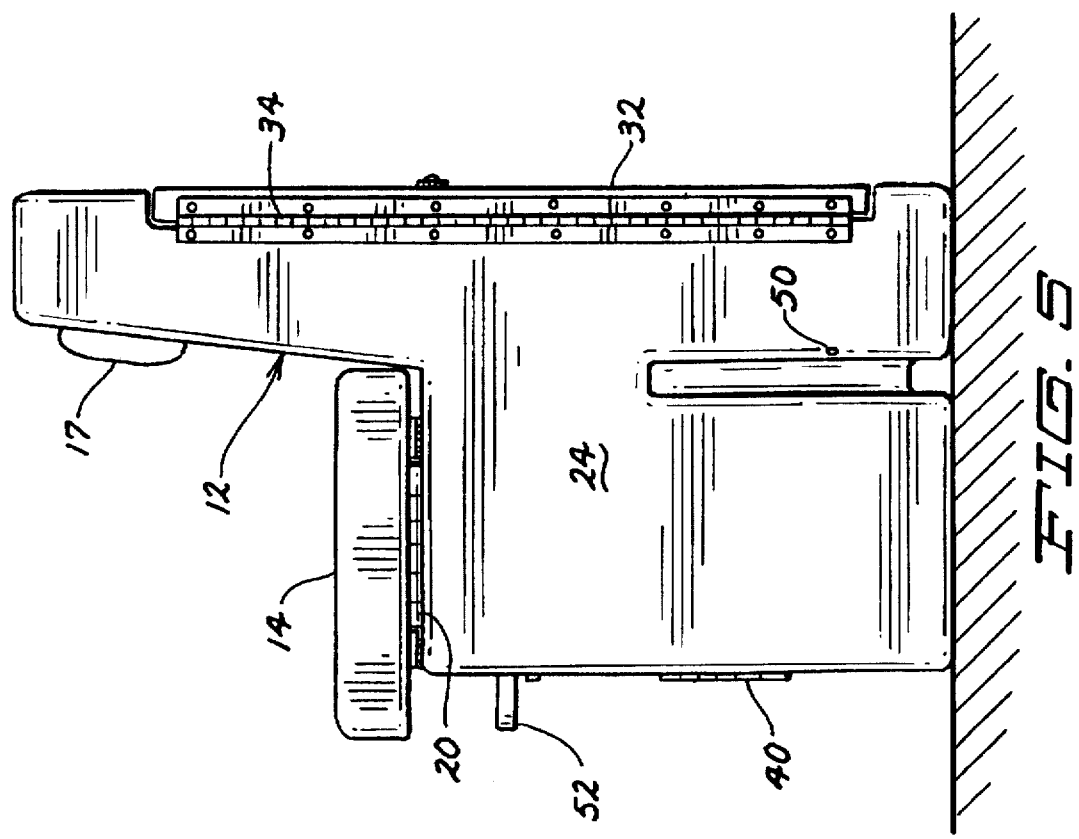

5,692,335

1

COMBINED SEAT AND TACKLE CONTAINER FOR ICE FISHING

BACKGROUND OF THE INVENTION

1. Technical Field

The present invention relates generally to seating devices used by ice fishermen, and in particular to such seating devices having integral storage areas for protecting the fisherman's equipment from the elements.

2. Background Information

Ice fishing is a very popular sport in areas where bodies of water freeze over during the winter months. Many different devices have been developed over the years to be used as aids to ice fishermen. Because of the cold weather, the ice fisherman must also try to keep warm while maintaining watch over the fishing line. Because of the need to keep warm, a number of specialized devices have been developed to help the ice fisherman keep track of the status of the fishing line while staying comfortable, either nearby or at a distance.

Many ice fishermen prefer to remain outdoors and near their fishing hole. A stool may help them remain comfortable by sitting while watching their fishing line, but the other items needed for ice fishing must be left lying in the open, on the ice and snow. For example, the ice fisherman may have several fishing poles along, even if no more than one is used at a time. Additionally, there may be tackle in the form of artificial lures, extra fishing line, and other tools that may be needed. There may also be snacks or insulated containers for heated beverages which, if left lying on the snow and ice, may lose their heat or even freeze. Finally, fish that are caught, if left lying on the ice, may become frozen to the ice or covered in falling snow. This is also true of the extra fishing rods and tools the fisherman may carry with him.

To be sure, tackle boxes, lunch pails, backpacks, tarps, and even buckets may be used for holding and carrying many of these items. However, if the desired fishing location is inaccessible from the fisherman's vehicle, many trips on foot may be required to move all the needed items to the desired fishing location. Similarly, at the end of the fishing day, when the sun has gone down and the weather has turned colder, multiple trips may be exhausting, and even potentially dangerous.

The combined seat and tackle container for ice fishing of the present invention overcomes difficulties described above and affords other features and advantages heretofore not available.

SUMMARY OF THE INVENTION

The combined seat and tackle container for ice fishing of the present invention includes a seating portion on which an ice fisherman may rest while watching an ice fishing pole. Additionally, it includes compartments for holding a variety of fishing needs. For example, a rear storage compartment integral with the back resting portion may be used for storage of spare fishing rods or tip-ups. A hinged seat covers an upper storage compartment in which small items such as snacks and beverages may be stored, and the underside of the hinged seat may be covered with a material such as cork

2 or styrofoam into which the hooks of artificial fishing lures may be placed for storage. Finally, a lower storage compartment therebeneath may be used for storage of fish that have been caught. A carrying handle may be attached to the housing to make it easy to transport the assembly.

It is an object of this invention to provide an easily transportable seating device for an ice fisherman, preferably including a back supporting member, on which the ice fisherman may comfortably rest while ice fishing. It is also an object of this invention that the seating device include integral storage compartments in which may be placed a variety of ice fishing supplies, including rods, tackle, and snacks and beverages, to keep them dry and easily accessible. It is a further object of this invention to provide a storage compartment in which fresh fish may be contained, so that they will be protected from the elements and not allowed to freeze to the snow and ice, and may easily be transported after the ice fishing is completed.

Other objects and advantages of the invention will become apparent from the following detailed description and from the appended drawings in which like numbers have been used to describe like parts throughout the several views.

BRIEF DESCRIPTION OF THE DRAWINGS

FIG. 1 is a perspective view of the combined seat and tackle container of the present invention;

FIG. 2 is a front view of the combined seat and tackle container;

FIG. 3 is a right side view of the combined seat and tackle container, showing the hinged seat member in the open position for access to the storage compartment located therebeneath;

FIG. 4 is a rear view of the combined seat and tackle container, showing the rear storage compartment opened, with a fishing rod positioned for storage therein;

FIG. 5 is a left side view of the combined seat and tackle container;

FIG. 6 is a bottom plan view of the combined seat and tackle container;

FIG. 7 is a top plan view of the combined seat and tackle container; and

DESCRIPTION OF THE PREFERRED EMBODIMENT

Figure 8:
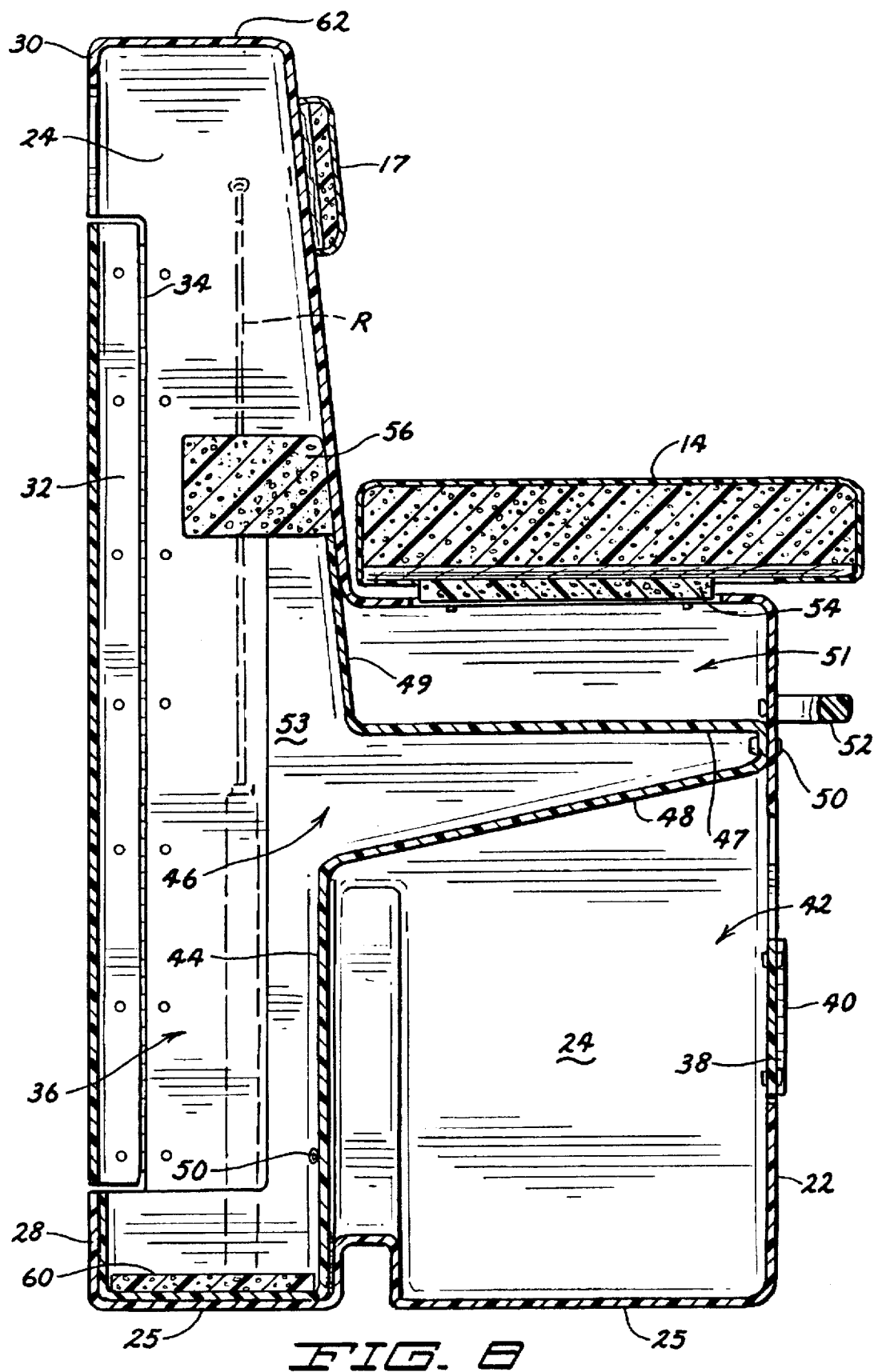
FIG. 8 is a side sectional view of the combined seat and tackle container, taken along line 8—8 of FIG. 1.

With reference to the drawings, and in particular to FIG. 1, the combined seat and tackle container for ice fishermen is generally indicated by reference numeral 10. The configuration of seat and tackle container 10 is generally defined by housing 12. Housing 12 is preferably rotationally molded of polyethylene, but may also be injection molded. Housing 12 includes a seat portion 14 resting on a base portion 16, with a backrest portion 18 projecting upwardly from base portion 16. Backrest portion 18 preferably includes a cushion 17 fixedly attached as by rivets 19 to upper wall 21. As shown in FIGS. 2 and 3, seat portion 14 is preferably hingedly attached to base portion 16, as by hinge 20. Pivoting seat portion 14 may be latched in a closed, generally horizontal position using a releasable fastener such as a VELCRO fastener 23. It is preferred that the upper, resting surface of seat portion 14 be approximately 20 inches from the bottom surface 25 of housing 12.

Base portion 16 includes a front wall 22, a left side wall 24 and a right side wall 26. Left and right side walls 24, 26, respectively, extend upwardly to provide side wall portions for backrest portion 18. A lower rear wall portion 28 and an upper rear wall portion 30 extend across the back of housing 12, between the left and right side walls 24, 26, respectively. A rear door 32 preferably hingedly attached to left side wall 24 as by hinge 34 extends vertically between lower rear wall portion 28 and upper rear wall portion 30. Rear door 34 provides access to a rear storage compartment 36, extending between left side wall 24 and right side wall 26. Rear door 32 may be latched in a closed position using a releasable fastener such as a metal snap assembly 35, including strap 37. Similarly, a front door 38 preferably hingedly attached to front wall 22 as by hinge 40 provides access to lower storage compartment 42. Front door 38 may be latched in a closed position using a releasable fastener such as a metal snap assembly 41. The bottom surface 25 of base portion 16 also defines the bottom wall of rear storage compartment 36 and lower storage compartment 42. For ease of transportation, it is preferred that the overall height of seat and tackle container 10 be approximately 30 inches, although a tolerance of plus or minus approximately three inches is acceptable.

A dividing wall 44 separates rear storage compartment 36 from lower storage compartment 42. Dividing wall 44 is preferably part of a polyethylene insert or liner 46 placed within housing 12, as best illustrated in FIG. 8. Plastic insert 46 also provides an upper wall 48 for lower storage compartment 42. Insert 46 is fixedly attached to housing 12 as by rivets 50, securing insert 46 to front wall 22 and left and right side walls 24, 26, respectively. As shown in the drawings, a strap or handle 52 may be fastened to front wall 22 as a carrying member for easily transporting combined seat and tackle container 10. Alternatively, handle 52 may also be attached to front wall 22 using the same rivets 50, as shown in FIG. 8, that fixedly attach insert 46 to front wall 22. Insert 46 also preferably defines a lower wall 47 and a rear wall 49 for upper storage compartment 51, which is accessible when seat portion 14 is pivoted upwardly as shown in FIGS. 2 and 3. Insert 46 includes a left side wall 53 and a right side wall, not shown, overlying interior surfaces of housing sidewalls 24, 26, respectively. Insert 46 may be attached to housing 12 as by a bead of sealing compound 45 or additional rivets 50.

Referring to FIG. 3, an attachment member such as a styrofoam sheet 54 may be affixed to the bottom side of seat portion 14. Styrofoam sheet 54 may be used for inserting the pointed portions of a fishing hook as attached, for example, to an artificial lure L. Thus, a number of lures L may be conveniently located beneath seat portion 14 for easy access by an ice fisherman while ice fishing.

Referring to FIGS. 4 and 8, illustrated is a fishing rod R that may be conveniently stored in rear storage compartment 36. To maintain fishing rod R in an upright storage position, a positioning member such as styrofoam block 56 may be attached to an inner surface of storage compartment 36 as, for example, by gluing block 56 to the rear surface of upper wall 21 and the inner surfaces of left and right side walls 24, 26, respectively. Block 56 is shown having a number of slits 58 cut therein for releasably receiving fishing rod R in an upright storage position. In addition, a positioning member such as styrofoam insert 60 may be positioned in the bottom of rear storage compartment 36, on which the ends of rods R may be rested to reduce slippage during transportation.

Additional accessories include a light (not shown) that may be positioned in an opening in front wall 22, as, for example, at the front of upper storage compartment 51, for illuminating the ice fishing area after dark. Additionally, a shoulder strap (not shown) may be attached to housing 12, as by snap attachment to top wall 62 and front wall 22, respectively.

In use, combined seat and tackle container 10 may be used to easily store and transport a variety of supplied required by the ice fisherman. For example, as discussed earlier, fishing rods R may be conveniently stored in rear storage compartment 42, and lures L may be releasably attached to styrofoam sheet 54 in upper storage compartment 51, underlying pivoting seat portion 14. While fishing, the fish may be placed in lower storage compartment 42 to be easily transported at the end of the day, without having to sever them from the ice and snow. The entire assembly may be easily transported using carrying handle 52.

While the preferred embodiments of the invention have been described, it should be understood that various changes, adaptations and modifications may be made therein without departing from the spirit of the invention and the scope of the appended claims.

What is claimed is:

1. An ice fishing seat with integral storage compartments, comprising:

a housing having a base portion with a front wall, first and second side walls, and a lower wall;

a generally horizontally extending seat portion on top of said base portion;

a backrest portion extending upwardly from said base portion behind said seat portion, said backrest portion having an upper surface;

a generally upright wall integral with said housing extending from said lower wall of said base portion to said upper surface of said backrest portion, generally rearward of said backrest portion, said first and second side walls of said base portion extending upwardly between said upright wall and said backrest portion;

at least two storage compartments integral with said housing; and a rear door member integral with said upright wall, said rear door member pivotally attached to said housing, said rear door member providing access to a second storage compartment.

2. The ice fishing seat with integral storage compartments described in claim 1, wherein said second storage compartment further comprises:

first and second side walls defined by said first and second side walls of said housing;

a second compartment front wall; and a second compartment lower wall, defined by said lower wall of said base portion.

3. The ice fishing seat with integral storage compartments described in claim 1, wherein said housing further comprises:

a front door member pivotally attached to said front wall of said base portion providing access therethrough to a third storage compartment, generally below said first storage compartment.

4. The ice fishing seat with integral storage compartments described in claim 3, wherein said third storage compartment further comprises:

a front wall defined by said front wall of said housing base portion;

first and second side walls defined by said first and second side walls of said housing base portion;

a third compartment rear wall; and a third compartment lower wall, defined by said lower wall of said base portion.

5. The ice fishing seat with integral storage compartments described in claim 3, further comprising an insert member positioned within said housing, said insert extending between said first and second side walls of said housing, and extending generally upwardly from said lower wall of said base portion to said backrest portion.

6. The ice fishing seat with integral storage compartments described in claim 1, wherein:

said seat portion is pivotally attached to said first side wall portion of said base portion of said housing, giving access to a first storage compartment therebeneath.

7. The ice fishing seat with integral storage compartments described in claim 6, wherein said first storage compartment further comprises:

a front wall defined by said front wall of said housing base portion;

first and second side walls defined by said first and second side walls of said housing base portion;

a first compartment rear wall; and a first compartment lower wall.

* * * * *